United States Patent [19]

Bailey

[11] 4,434,605

[45] Mar. 6, 1984

[54] MOWER-CONDITIONER

[75] Inventor: Alfred J. Bailey, Coventry, England

[73] Assignee: Massey-Ferguson Services N.V., Curacao, Netherlands Antilles

[21] Appl. No.: 339,458

[22] PCT Filed: Apr. 15, 1981

[86] PCT No.: PCT/GB81/00069
§ 371 Date: Dec. 21, 1981
§ 102(e) Date: Dec. 21, 1981

[87] PCT Pub. No.: WO81/02966
PCT Pub. Date: Oct. 29, 1981

[30] Foreign Application Priority Data

Apr. 22, 1980 [GB] United Kingdom ................ 8013131

[51] Int. Cl.³ ............................................ A01D 47/00
[52] U.S. Cl. ................................. 56/16.4; 56/DIG. 1
[58] Field of Search .................. 56/13.6, DIG. 1, 192, 56/14.4, 16.4

[56] References Cited

U.S. PATENT DOCUMENTS 3,672,132  6/1972  Scarnato ........................ 56/DIG. 1

FOREIGN PATENT DOCUMENTS 1946321  4/1980  Fed. Rep. of Germany ....... 56/13.6

Primary Examiner—Jay N. Eskovitz
Attorney, Agent, or Firm—Robert L. Farris

[57] ABSTRACT

A mower conditioner having a conditioning rotor (22) which is supported at its ends in bearing units (51) that are secured to side support walls (24) by releasable fastening means (56) including a pair of coaxial fasteners defining an axis (68), parallel to that of the rotor axis (23), about which the bearing units (51) and rotor (22) can swing downwards until the rotor (22) contacts the ground, thereby facilitating removal and re-attachment of the conditioning rotor (22). The rotor axis and axis of the fasteners may lie in a plane that is inclined upwards and rearwards from the ground. The rotor (22) may be driven at one end by a spindle (81) that is axially disengageable from the rotor. The spindle (81) may be driven by a chain drive mechanism (71, 76) including an intermediate double ring sprocket (73) that is reversible on its shaft (86) to allow two drive ratios to be selected.

10 Claims, 4 Drawing Figures

MOWER-CONDITIONER

TECHNICAL FIELD

This invention relates to mower conditioners of the type in which a conditioning rotor is arranged with its axis substantially horizontal so as to receive cut crop and treat it mechanically, for example by laceration or bruising, as it passes the crop rearwards onto the ground to dry.

A mower conditioner is disclosed in United Kingdom patent application No. 2000952 in which a conditioning rotor is mounted on a rotary mower behind two crop cutting drums arranged alongside one another so as to rotate in opposite directions about vertical axes and feed cut crop rearwards therebetween. The conditioning rotor is removably connected between two side walls so as to allow the mower to be used either with or without the conditioning rotor. A bearing unit is connected to each side wall so as to lie within the space beween the side walls, and the conditioning rotor is connected by screw fasteners between the two bearing units. The bearing unit on one side is connected through a drive connection to the drive mechanism of the two crop cutting drums.

A disadvantage with this known mower conditioner is that the conditioning rotor, once removed, cannot be readily reconnected to the bearing units. The rotor has to be lifted into position and the bearing units rotated to align the apertures for insertion of the screw fasteners. Generally this will be a two man operation.

A further disadvantage is that the bearing units are still present between the side walls within the path of the cut crop when the conditioning rotor is removed and this can impair crop flow.

DISCLOSURE OF THE INVENTION

An object of the present invention is to provide a mower conditioner with a crop conditioning rotor that is mounted between two side walls so that it can be readily removed and reconnected, and does not leave anything to impair crop flow when removed.

According to one aspect, the invention consists in a mower conditioner in which the conditioning unit is supported at each end in bearings that are secured to side support walls between which cut crop passes rearwards, and in which the rotor is driven through a coaxial drive spindle at one end, the drive spindle being axially disengageable from the rotor and the bearings being detachably secured to the side support walls so that the rotor can be readily removed by withdrawal of the drive spindle and release of the bearings, the opposed faces of the side support walls being left free of all projections thereafter.

According to another aspect, the invention consists in a mower conditioner in which the conditioning rotor is supported at its ends in bearing units that are secured to side support walls by releasable fastening means including a pair of coaxial fasteners defining an axis, parallel to that of the rotor axis, about which the bearing units and rotor can swing downwards until the rotor contacts the ground, thereby facilitating removal and re-attachment of the conditioning rotor.

To attach the rotor it is rolled into position between the side support walls and the bearing units are angularly positioned for insertion of the coaxial fasteners. The rotor can then be lifted and swung about the axis of the coaxial fasteners until the bearing units are positioned for insertion of further releasable fasteners. The same procedure is carried out in reverse to remove the rotor. Preferably, quick-release fasteners are used, for example, lockable pins. By these means it is possible for an operator to remove and re-attach the conditioning rotor single-handed.

DESCRIPTION OF THE DRAWINGS

The invention will now be described by way of example with reference to the accompanying drawings in which.

BEST MODE OF CARRYING OUT THE INVENTION

Figure 1:
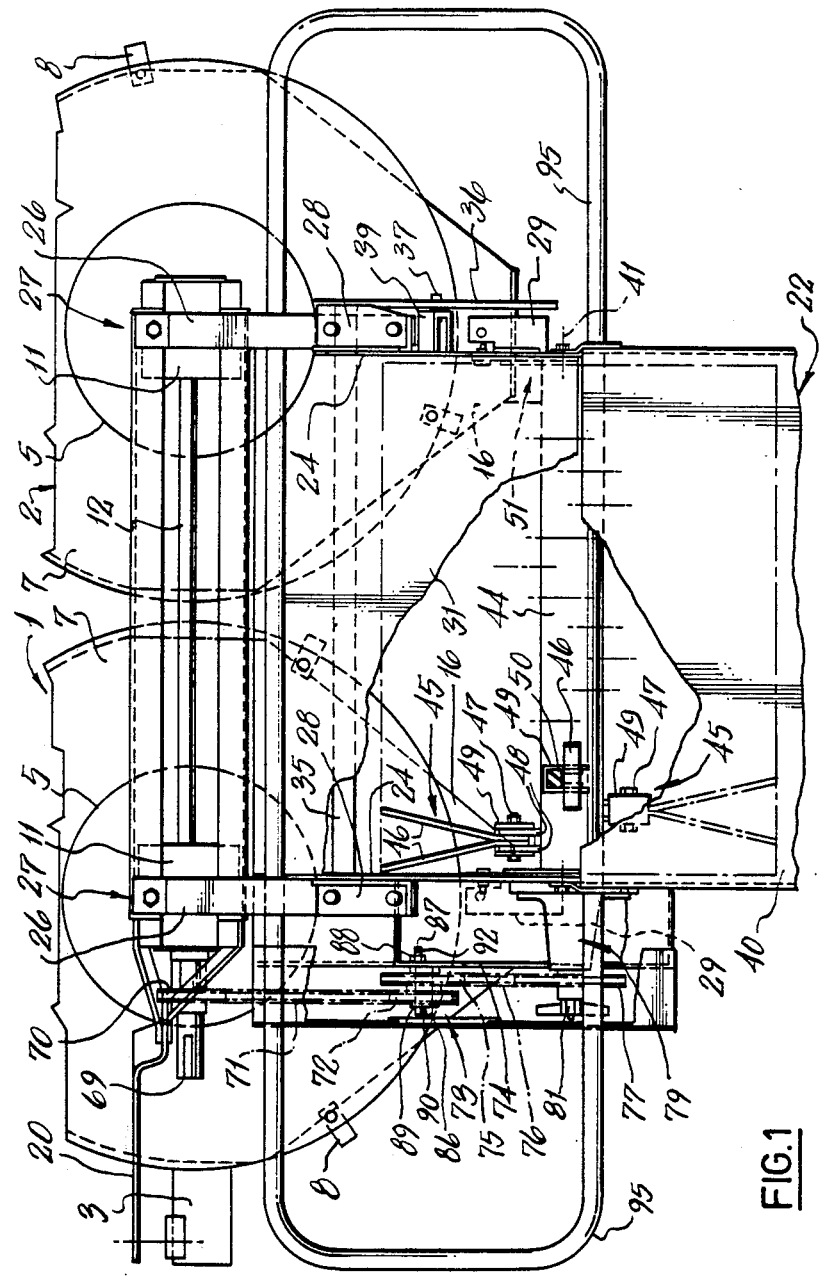
FIG. 1 is a plan view of a mower conditioner according to the invention.

The illustrated mower comprises two rotary cutters 1, 2 that are rotatably supported with axes upright on a draught bar 3 that carries a hitch mechanism 4 at the left-hand end (see FIG. 3) whereby the mower can be attached to the three-point support mechanism of a tractor so that it is offset to the right-hand side of the tractor in use.

The cutters 1, 2 are of the drum type comprising a feed drum 5 carrying upright crop feed strips 6 and a lower peripheral skirt 7 with crop cutting knives 8 pivotally connected around its edge. Each cutter is rotatably supported via bearings on an upright spigot 9 fixed to the draught bar 4. Draught forces are applied to the cutters exclusively through the draught bar 3 and the drag bar 10 of the hitch mechanism 4. The cutters are both driven from above through a transmission system comprising individual overhead gear boxes 11, an intermediate drive shaft 12 (FIG. 1) between the gearboxes 11, an input drive line to the left-hand gear box 11 comprising a shaft 13, a slip clutch 14, a main gearbox 15 and a power-take-off connection (not shown) for the tractor power-take-off shaft. The cutters contra-rotate and serve to cut crop and feed this rearwards as a single swathe between the two drums 5.

Ground engaging skids 16 on the underside of the draught bar 3 support the mower above the ground when mowing. During transport the mower is lifted off the ground by the tractor three point support mechanism and swings to the rear about an upright pivot post 17 forming part of the hitch mechanism. A linkage mechanism 18, 19, 20 helps support the mower when lifted from the ground, a pin and slot connection 21 between the link 18 and the top of the pivot post 17 allowing the mower to follow ground contours when mowing.

A conditioning rotor 22 is mounted behind the two cutter drums 5 with its axis 23 extending parallel to the draught bar 3 and is driven so as to pick up cut crop from between the drums and carry this rearwards over the top of the rotor, conditioning the crop in the process.

The rotor 22 is supported between two upright side walls 24 that extend rearwards from each drum 5 in fore and aft planes that are spaced slightly away from the axes 25 of the drums towards the gap between them. Each side wall 24 is supported between the overhead gear box 11 of the adjacent cutter and the rear of the skid 16 beneath the cutter. A strip of steel 26 is bolted to the top of the gear box 11 at 27 and extends rearwards and upwards with its width dimension horizontal so that it can flex up and down. The rear end of the strip 26 is bolted via a bracket 28 to an upper portion of the side wall 24. A bracket 29 connects the rear of the skid 16 to a lower portion of the side wall 24. The resilience of the strips 26 and skid 16 helps to distribute the load of the rotor 22 more evenly between the gear box 11 and skid 16.

Figure 2:
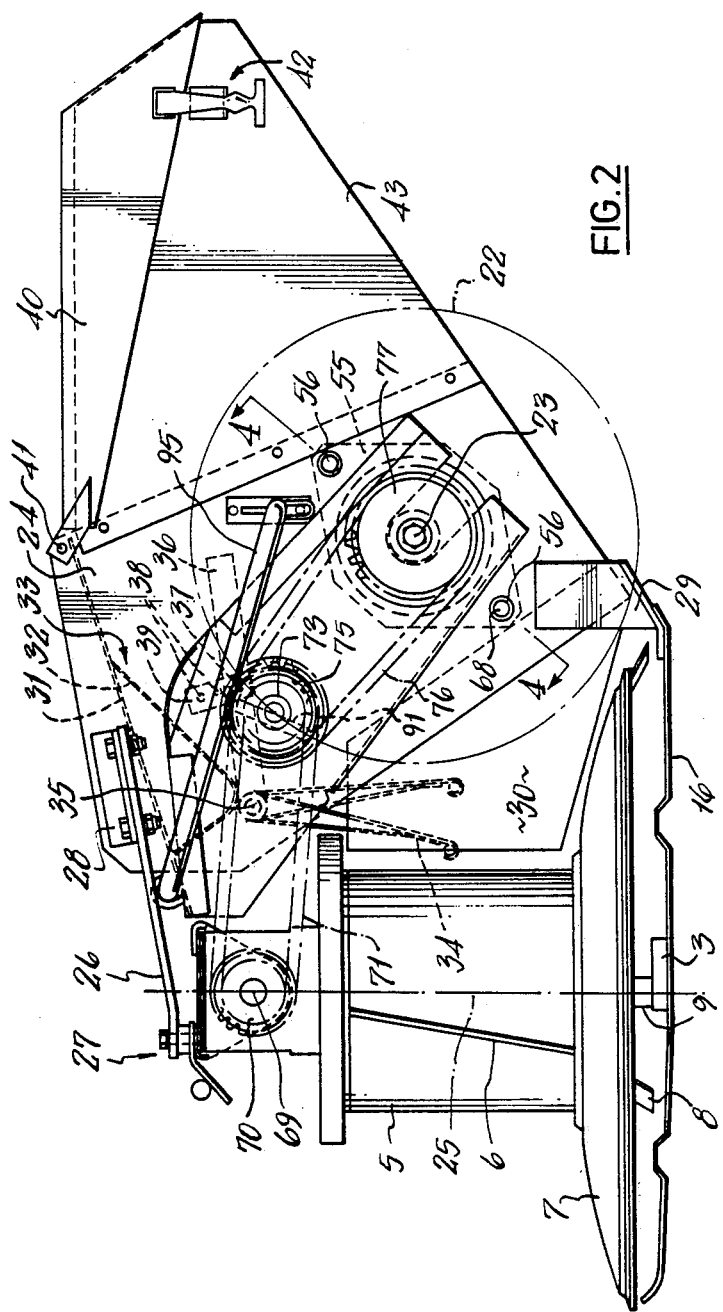
FIG. 2 is a side elevation of the drive end of the mower conditioner of FIG. 1.

Each side wall 24 has a panel at its leading edge that projects forwards and is shaped to match the profile of the adjacent drums 5, as shown in FIG. 2, so that the side walls 24 serve to collect and guide the cut crop as it passes rearwards between the cutters thereby ensuring that all of the crop is delivered to the conditioning rotor 22.

A top panel 31 is connected between the upper edges of the side walls 24, and supports beneath it and between the side walls 24 an inverted ridge-shaped panel 32 having a downwardly and rearwardly directed face 33 that defines a crop passage from the top of the drums 5 rearwards over the top of the rotor 22.

An adjustable crop guide flap 34 is supported on a lateral shaft 35 between the side walls 24. The shaft 35 extends along the length of and closely adjacent to the ridge in the panel 30, and the guide flap 34 projects downwads from the shaft 35 between the rear of the drums and the conditioning rotor. Adjustment of the guide flap 34 relative to the conditioning rotor is effected by a control lever 36 secured to the right-hand end of the shaft 35. The lever is a spring steel strip that carries a peg 37 and that can be flexed laterally so as to selectively engage the peg in one of a set of three holes 38 in a bracket 39 mounted on the right-hand side wall 24. A hood 40 is hinged about a horizontal axis 41 along the rear of the top panel 31 and assumes a closed position, as shown in FIG. 2, in which it is secured by releasable fasteners 42 to panels 43 that project rearwards at the rear edges of the side walls 24. The axis 41 is spaced slightly forwards of the axis 23 of the rotor 22 so as to give good access to the rotor when the hood is swung to its open position on top of the top panel 31.

The conditioning rotor 22 comprises a shaft 44 on which is mounted a plurality of conditioning elements 45 in the form of pairs of outwardly directed divergent arms 46 so that the arms of successive elements overlap axially along the rotor. Each pair of arms 46 is secured between a pair of brackets 48 on the shaft 44 by a bolt 47, and a channel-section member 49 encompasses the brackets 48 and is secured in place by the same bolt. A resilient block 50 is housed within the bracket 48 on the trailing side of the arms 46 so that it is compressed by deflection of the arms should they engage an obstruction in use.

A bearing unit 51 is secured to each end of the rotor shaft 44 comprising an outer member 52 that is secured in an open end of the shaft and an inner member 53 that is adapted to be releasably secured to the adjacent side wall 24, the two members 52, 53 being separated by a bearing race 54. The outer end of the inner member 53 is secured to a fastening plate 55 that abuts the side wall 24 and is releasably secured to the side wall by a pair of pin fasteners 56 engaging pairs of aligned apertures 57, 58 in the plate 55 and side walls 24. A crop seal is provided to protect the bearing comprising a radial annular flange 59 on the outer member 52 and an upstanding ring 60 on the plate 55 closely encircling the outer edge of the flange 59.

Each pin fastener 56 has a tapered end 61 for ease of insertion into the apertures 57, 58 and a head 62 that engages a recess 63 formed in a strengthening ring 64 on the inside of the plate 55. A hole 65 is formed diametrically through the tapered end of each pin 56 to receive a lynch pin 66 that abuts a strengthening ring 67 on the outside of the side wall 24 to hold the pin 56 in place with the plate 55 and wall 24 in pressing contact.

The pairs of fastening apertures 58 in the side walls 24 are arranged in a plane 4—4 including the axis 23 of the rotor, and this plane is inclined rearwards from bottom to top, as shown in FIG. 2. The lower pair of apertures 58 in the side walls 24 are coaxially aligned so that the corresponding fastener pins 56 that engage these apertures and the apertures 57 to connect the rotor to the side walls, define a pivot axis 68 for the bearing units 51 and rotor 22. Thus on connecting the rotor between the side walls 24, the rotor can be rolled into position the bearing units located angularly and the lower fastener pins 56 inserted and locked in position by the lynch pins 66. The whole rotor can then be lifted and swung upwards about the axis 68 of the lower pins 56 until the upper apertures 57, 58 are aligned and the upper fastener pins 56 can be inserted and locked in position with their clevis pins 66. It will be appreciated that this whole process is a relatively simple one man operation. The process can be equally simply carried in reverse by one man to remove the rotor. On knocking through, the pins 56 will tend to fall out as their tapered ends 61 move back into the apertures 57, 58. Also, the heads 62 of the pins prevent them from being inserted and locked in position the wrong way round, that is, from the outside.

Figure 3:
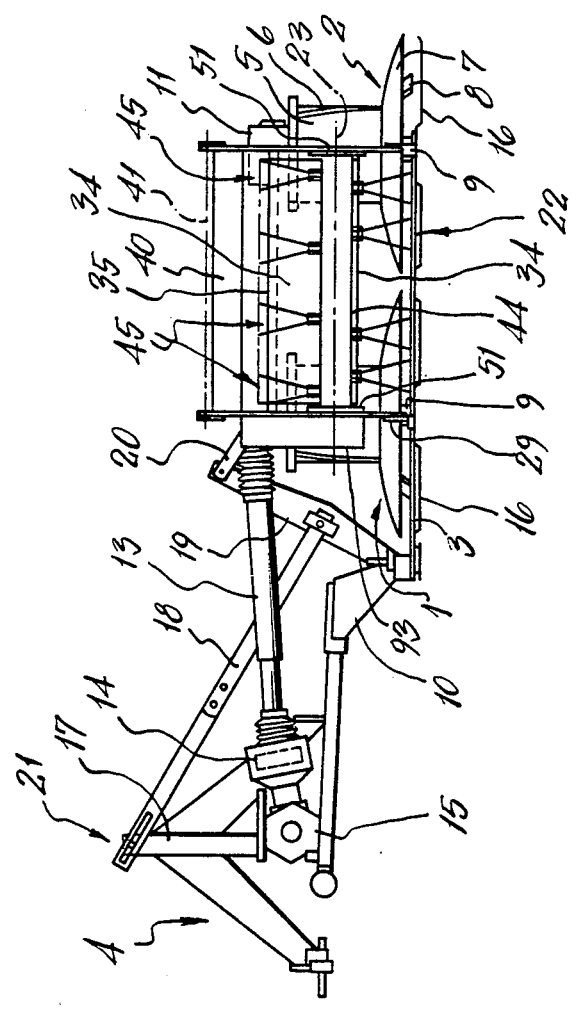
FIG. 3 is a rear elevation of the mower conditioner of FIG. 1.
Figure 4:
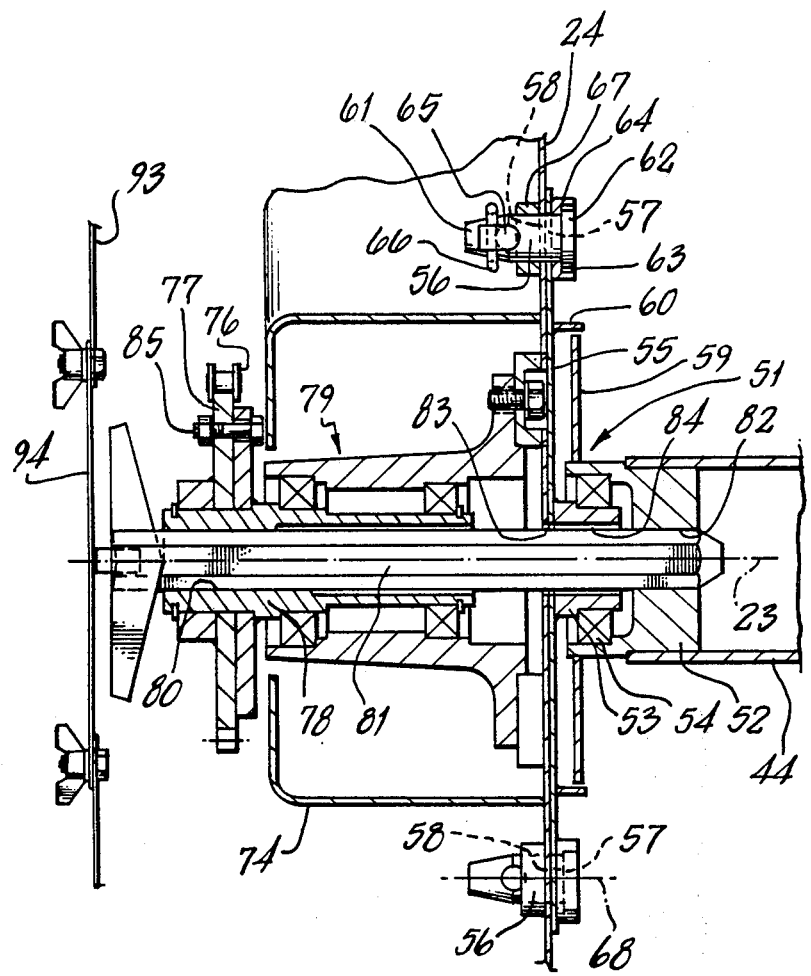
FIG. 4 is the axial section of the bearing assembly at the drive end of the conditioning rotor taken along the plane 4—4 in FIG. 2.

The drive mechanism for the conditioning rotor 22 is located on the left-hand side of the mower as seen in FIGS. 1 and 3 and comprises a chain drive that is taken from the cutter drive mechanism at the input to the lefthand gear box 11 via a coupler 69 that carries a sprocket wheel 70. A first drive chain 71 engages the sprocket wheel 70 and the teeth ring 72 on an intermediate double ring sprocket 73 that is mounted on the outside of a channel-section member 74 connected to the side wall 24. A second drive chain 76 engages the second teeth ring 75 of the double ring sprocket 73 and engages a sprocket wheel 77 that is connected to a drive sleeve 78 supported in an outer bearing assembly 79 mounted on the side wall 24 within the channel member 74. The drive sleeve 78 is arranged coaxially with the rotor axis 23 and has a hexagonal bore 80 whereby it can be coupled to the rotor by a hexagonal section spindle 81 that is insertable in the bore 80 and into a similar hexagonal bore 82 in the outer bearing member 52. Apertures, 83, 84 in the side wall 24 and bearing components 55, 53 accommodate insertion of the spindle 81. Shear pins 84 connect the sprocket wheel 77 to the drive sleeve 78 so as to protect the rotor and chain drive mechanism should rotation of the rotor be obstructed.

The intermediate double ring sprocket 73 is rotatably supported on a spindle 86 that is connected to the channel-section member 74 by a stud and nut connection 87, 88. The sprocket 73 is retained on the spindle 86 by a washer 89 and split pin 90 that allow the sprocket 73 to be removed and replaced with the positions of the teeth rings 72, 75 reversed, thereby changing the drive ratio of the chain drive and thus the final speed of the rotor. In this way the rotor can be made to operate at either of two speeds to suit different crops.

Reversal of the sprocket 73 has also to accomodate the different lengths of the two drive chains 71, 76. Therefore, the stud 87 is offset from the axis on the spindle 86 and is non-rotatably located in a slot 91 in the member 74 by means of flats 92 provided on the stud 87 so that when the sprocket is reversed the spindle can be rotated through 180° and the stud 87 inserted in the slot 91 in its other position.

A removable drive cover 93 is provided over the sprocket wheels 73, 77 and chains 71, 76 and an access panel 94 is provided in the cover 93 so as to allow withdrawal of the drive spindle 81.

Protective skirts may also be provided around the cutters 1, 2 on either side of the conditioning rotor 22 by suspending the skirts from two laterally projecting U-shaped tubular frames 95.

In use, the conditioning elements 45 of the rotor 22 pick up crop as it is fed rearwards between the cutter drums 5 on the peripheral skirts 7. The crop is then passed upwards through the channel defined beneath the guide flap 34 and panel 33, finally being discharged over the top of the rotor beneath the hood 40. The initial engagement of the conditioning elements with the crop, and the relative movement between the crop and flap 34 and panel 33 and between different layers of the crop produces the conditioning effect. The degree of conditioning can be controlled by adjustment of the flap, a closer spacing of the flap relative to the rotor producing increased conditioning.

When no conditioning is required the rotor 22 is removed by withdrawing the drive spindle 81 to disconnect the drive mechanism, removing the upper pair of fastener pins 56 to allow the rotor to swing down onto the ground, and finally removing the lower pair of fastener pins 56. The rotor can then be rolled away. the guide flap 34 is then swung rearwards by the control lever 36 so as to clear the space behind the drums for the passage of cut crop. The control lever 36 engages the sides of the strips 26 to hold the flap in its rearwards position.

It will be appreciated that when the rotor is removed the inner surfaces of the side walls 24 are left completely free of any obstruction so that the passage of cut crop is not hindered. The positioning of the side walls 24 relative to the axes of the cutters 1, 2 also serves to allow the unhindered flow of cut crop.

I claim:

1. A mower conditioner having a conditioning rotor which is supported at its ends in bearing units that are secured to side support walls characterized in that said bearing units (51) are secured to said side support walls (24) by releasable fastening means including a pair of coaxial fasteners (56) defining an axis (68) parallel to that of the rotor axis (23), about which the bearing units (51) and rotor (22) can swing downwards until the rotor (22) contacts the ground, thereby facilitating removal and re-attachment of the conditioning rotor (22).

2. A mower conditioner as claimed in claim 1 further characterised in that the axis (68) of the coaxial fasteners (56) and the rotor axis (23) lie in a plane that is inclined upwards and rearwards from the ground.

3. A mower conditioner as claimed in claims 1 or 2 further characterised in that the releasable fasteners means comprise pins (56) that are held captive by lynch pins (66).

4. A mower conditioner having a conditioning unit which is supported at each end in bearings that are secured to side support walls between which cut crop passes rearwards, and in which the rotor is driven through a coaxial drive spindle at one end, characterised in that the drive spindle (81) is axially disengageable from the rotor (22) and the bearings (51) are detachably secured to the side support walls (24) so that the rotor (22) can be readily removed by withdrawal of the drive spindle (81) and release of the bearings (51), the opposed faces of the side support walls (24) being left free of all projections thereafter.

5. A mower conditioner as claimed in claim 4 further characterised in that it comprises rotary cutters (1, 2) supported with their axes upright, cutter drive means (11, 12) arranged above the cutters (1, 2), and a chain drive (70, 71, 73, 76, 77, 78) arranged at one side of the mower conditioner and connecting the cutter drive means (11, 12) to the drive spindle (81).

6. A mower conditioner as claimed in claim 5 further characterised in that the cutter drive means (11, 12) has an input drive shaft (13) to which a coupler (69) is connected that carries a sprocket wheel (70) for the chain drive.

7. A mower conditioner as claimed in claim 6 further characterised in that the chain drive comprises two chains (71, 76) that are connected through a double ring sprocket (73) on an intermediate spindle (86), said double ring sprocket (73) being reversible on said spindle (86) so that the two chains (71, 76) can engage either ring (72, 75) to give two drive ratios.

8. A mower conditioner as claimed in claim 7 further characterised in that the spindle (86) is connected to the conditioner by a fastener (87, 88) tha allows it to be rotated about an axis parallel to, but offset from, that of the spindle (86) so that the spindle can be rotated about the fastener axis to adjust the tension in both chains (71, 76).

9. A mower conditioner as claimed in claim 1 further characterised in that the mower comprises rotary cutters (1, 2) supported with their axes upright, a fixed skid (16) beneath the cutters on which the mower rides over the ground, and drive means (11) above the cutters that drives them from above, the side support walls (24) being connected between the skid (16) and the cutter drive means (11).

10. A mower conditioner as claimed in claim 9 further characterised in that the connection between the side support walls (24) and cutter drive means (11, 12) includes a resilient member (26) that flexes vertically to distribute the load between the skid (16) and the cutter drive means (11).

* * * * *